United States Patent [19]

Hollmann et al.

[11] 3,906,127

[45] Sept. 16, 1975

[54] DRAWING BOARD

[75] Inventors: Walter G. Hollmann, Libertyville; Harry O. Newlin, Skokie, both of Ill.

[73] Assignee: Teledyne, Inc., Los Angeles, Calif.

[22] Filed: Sept. 10, 1973

[21] Appl. No.: 395,593

[52] U.S. Cl. ............... 428/73; 52/618; 52/624; 312/231; 428/116
[51] Int. Cl.² ........................... B32B 3/12
[58] Field of Search ............ 161/43, 68, 69; 52/309, 52/615, 624, 618, 627; 29/455 LM; 156/197; 312/231

[56] References Cited
UNITED STATES PATENTS

| | | | |
|---|---|---|---|
| 2,197,556 | 4/1940 | Lowry | 52/624 |
| 2,501,180 | 3/1950 | Kunz | 161/68 |
| 2,609,314 | 9/1952 | Engel et al. | 161/68 X |
| 2,664,596 | 1/1954 | Greig | 52/624 X |
| 2,720,949 | 10/1955 | Pajak | 161/68 |
| 2,823,460 | 2/1958 | Weiler | 33/174 |
| 2,839,442 | 6/1958 | Whitaker | 161/69 X |
| 2,977,639 | 4/1961 | Barkhuff, Jr. et al. | 264/45 |
| 3,000,144 | 9/1961 | Kitson | 52/309 |
| 3,150,793 | 9/1964 | Messer | 264/45 X |
| 3,389,520 | 6/1968 | Gray et al. | 52/627 X |
| 3,396,062 | 8/1968 | White | 156/244 |
| 3,450,593 | 6/1969 | Fossier | 161/68 X |
| 3,546,841 | 12/1970 | Smith et al. | 52/615 X |

*Primary Examiner*—Harold Ansher
*Assistant Examiner*—Henry F. Epstein
*Attorney, Agent, or Firm*—Lockwood, Dewey, Zickert & Alex

[57] ABSTRACT

A lightweight, dimensionally stable, nonwood drawing board. An inner core of uniform thickness with parallel planar opposite surfaces is formed of a structural material such as resin-impregnated paper honeycomb, foamed polystyrene, or other structural materials having similar properties in respect to density, dimensional stability, dent resistance and strength in compression. The top and bottom surfaces of the inner core have laminated thereto facing sheets formed of smooth moisture-resistant plastic. An outer metal frame of U-shaped cross section completely embraces or extends around the inner core with the top and bottom surfaces of the frame legs being flush and contiguous with the top and bottom surfaces, respectively, of the inner core. The margins of the top and bottom facing sheets overlap onto the top and bottom surfaces of the frame legs and are adhered or laminated thereto so as to completely seal the inner core within the envelope formed by the top and bottom facing sheets and the frame.

2 Claims, 4 Drawing Figures

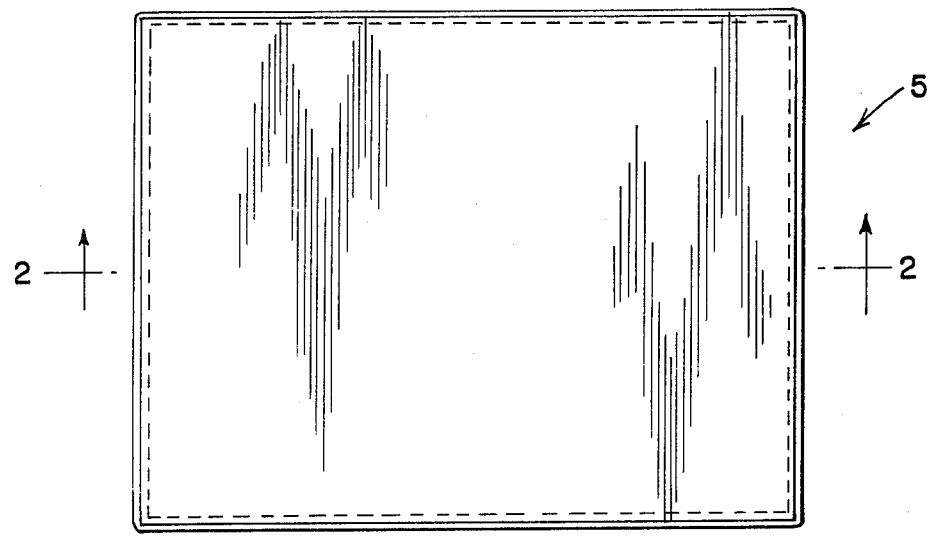
Fig. 1
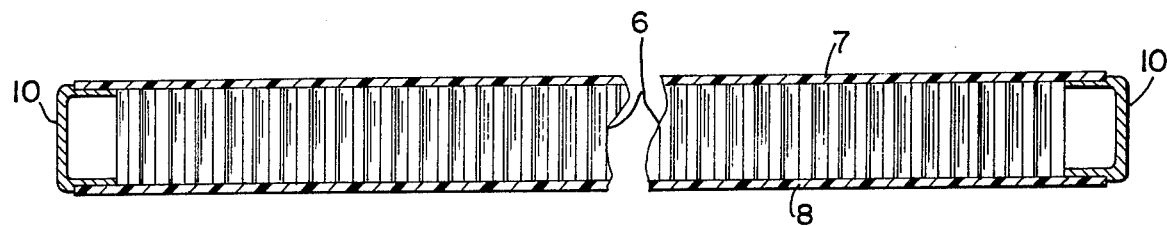
Fig. 2
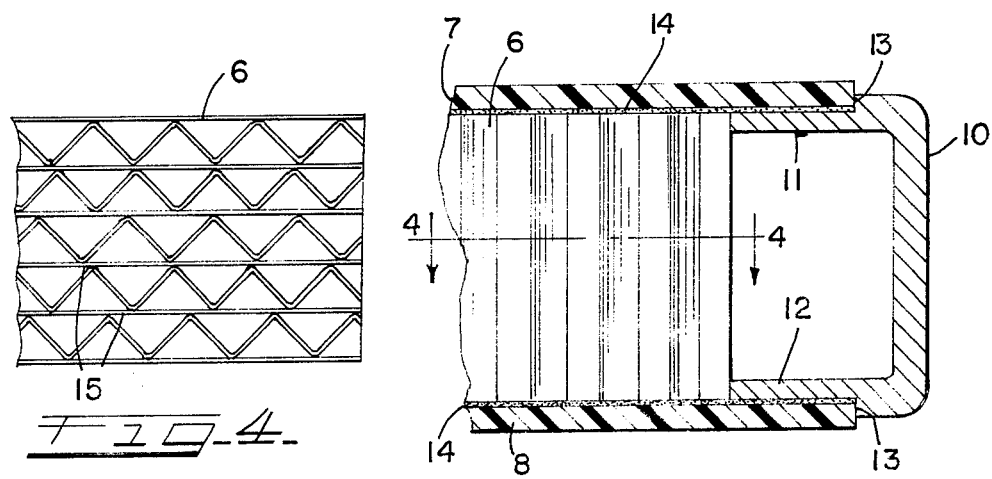
Fig. 4
Fig. 3

DRAWING BOARD

This invention relates generally to innovations and improvements in drawing or drafting boards such as used by professional or student draftsmen. More particularly, the invention relates to improvements in drawing boards whereby they are characterized by being lightweight, dimensionally stable, durable, economical and formed of nonwood materials.

Traditionally, drawing boards have been made of wood or wood materials. For example, several pieces of wood may be joined together by dowels and adhesive. Over a period of time such boards will warp and may become unglued. Furthermore, they are relatively heavy and relatively expensive to produce.

The object of the present invention, generally stated, is the provision of new and improved drawing boards formed of nonwood materials which are economical to produce from relatively inexpensive commercially available components. The new and improved drawing boards made in accordance with the present invention are lightweight, dimensionally stable, dent resistant and durable being formed of a lightweight, rigid inner core sealed in an envelope comprising plastic facing sheets and a frame having U-shaped cross section.

Certain more specific objects of the invention will be apparent from the following detailed description of a preferred embodiment of the invention and the suggested changes and permissible variations therein.

For a more specific understanding of the nature and scope of the invention reference may now be had to the following detailed description of a presently preferred embodiment taken with the accompanying drawings wherein:

FIG. 1 is a plan view of one surface of a drawing board made in accordance with the present invention;

FIG. 2 is a fragmentary vertical cross sectional view taken on line 2—2 of FIG. 1;

FIG. 3 is a fragmentary view on enlarged scale taken on the right hand edge of FIG. 1 showing the construction of the drawing board at one edge thereof; and FIG. 4 is a fragmentary sectional view on line 4—4 of FIG. 3.

Referring to the drawings, the drawing board indicated generally at 5 may be of any conventional size and shape but normally will be rectangular. The drawing board 5 consists of three main elements or components as best shown in FIGS. 2 and 3, namely, an inner core 6 of uniform thickness, a pair of upper and lower facing sheets 7 and 8 and a frame 10 of U-shaped cross section.

The core 6 illustrated in the drawings is formed of resin-impregnated paper honeycomb with the cells extending in a vertical direction. This is a preferred material and has several desirable properties for use as the core material. Other core materials having suitable dimensional stability, density, dent resistance and compressive strength may be formed of foamed plastics such as foamed polystyrene. Typically, the core 6 will have a thickness or vertical dimension of from ½ to ¾ inch and when formed of resin-impregnated paper honeycomb will typically have the following physical characteristics:

| | |
|---|---|
| Density | 2 to 4 lbs./cu. ft. |
| Bearing load strength in compression | (¼" cells) 14,900 to 26,600 lbs./sq. ft. |
| | (⅜" cells) 5,660 to 12,400 lbs./sq. ft. |
| | (½" cells) 4,520 to 8,910 lbs./sq. ft. |

When unimpregnated paper honeycomb sheets are used the density is lower and the compression strength is approximately one-half of the impregnated product.

A preferred core material is ⅝ inch thick resin-impregnated corrugated paper honeycomb sheets (FIG. 4) with ¼ inch vertical cells and having a phenolic resin content of 10 percent by weight and a density of 2.8 lbs./cu. ft. This material is available from The Verticel Company of Englewood, Colo.

When the core 6 is formed of high density foamed polystyrene (Styrafoam) it may have the following physical characteristics:

| | |
|---|---|
| Density | 2 to 5 lbs./cu. ft. |
| Bearing load strength in compression | 5,000 to 12,000 lbs./sq. ft. |

It will be appreciated that the top and bottom surfaces of the inner core 6 are parallel and planar. They are covered with the smooth-surfaced facing sheets 7 and 8 both of which will usually be formed of the same plastic material although they could be formed of different materials if desired. For example, one of the sheets 7 and 8 could be formed of white plastic while the other could be formed of "eye ease" green plastic. The thickness of the sheets 7 and 8 may range from 0.025 to 0.050 inch with 0.030 inch being satisfactory. One suitable material from which the sheets 7 and 8 may be formed is high impact polystyrene commercially available from several different sources. One specific material that has been used is white or eye ease green high impact polystyrene sheets 0.03 inch thick available commercially from General Tire & Rubber Co. as well as other manufacturers. Other plastic sheet materials may be used such as, ABS (acrylonitrile butadiene-styrene) sheets and Vinylite sheets. However, these later two materials tend to be more expensive than the high impact polystyrene sheets.

The sheets 7 and 8 are available with either a matte or gloss finish on either or both sides. A matte finish is usually preferred for the outer surfaces while the inner surface may have either a matte or gloss finish.

The drawing board 5 is bounded or enclosed on all four sides by the frame 10 which has a U-shaped cross section with the interconnecting web being straight and vertical in the embodiment shown although this could be arcuate as long as the two legs are horizontal.

Referring particularly to FIG. 3 it will be seen that for a substantial portion of their length measured from their tip or outer ends the legs 11 and 12 of the frame 10 have top and bottom exterior surfaces which are flush and contiguous with the top and bottom surfaces, respectively, of the inner core 6. This is an important feature since it allows the facing sheets 7 and 8 to overlap in planar continuation onto the surfaces of the legs 11 and 12.

The frame 10 is preferably formed of extruded aluminum. However, magnesium, steel or plastic may also be used. Preferably, the legs 11 and 12 have reduced thickness for a substantial portion of their length so as to provide shoulders 13—13 against which the edges of the top and bottom facing sheets 7 and 9 engage.

The facing sheets 7 and 8 are suitably adhered or laminated to the top and bottom surfaces of the inner core 6 and the surfaces of the frame legs 11 and 12 by suitable adhesive material as indicated at 14—14. One suitable adhesive that may be used to join high impact polystyrene facing sheets 7 and 8 to inner cores 6 formed of honeycombed paper as well as to the surfaces of the legs 11 and 12 of the frame 10 is a water base contact adhesive containing synthetic rubber latex base. Such a contact adhesive is commercially available, for example, from Roberts Consolidated Industries, Inc. of Monrovia, Calif. under the designation Anchor-Weld 3020. Other suitable contact adhesives of known commercial type may also be used include: Elmers Glue, Weldwood Contact Cement, B. F. Goodrich No. 1152T water base adhesive and B. F. Goodrich No. A-1177-B epoxy - 2 part adhesive.

In one satisfactory embodiment, Anchor-Weld 3020 water base contact adhesive was applied to the top and bottom opposite surfaces of the inner core 6 as well as to the surfaces of the legs 11 and 12 by brushing or roller. Then U.S. Plywood hot spray contact cement 248 (neoprene synthetic rubber base) is applied over the Anchor-Weld 3020 on the legs 11 and 12. The cement is allowed to dry and then the plastic facing sheets 7 and 8 are applied with pressure being applied by pinch rolls or hand rollers.

The structure shown and described in connection with FIGS. 1–4 has excellent beam strength particularly in the direction of the vertical paper separator strips 15—15 (FIG. 4) and also has excellent resistance to denting.

It will be seen that in the foregoing construction of the drawing board 5 the facing sheets 7 and 8 together with the frame 10 constitute a sealed envelope enclosing the inner core 6 and protecting it from moisture in the air or from spilled liquids, etc. In effect the core 6 is hermetically sealed in the envelope so as to have a substantially constant moisture content. This contributes greatly to the dimensional stability of the board 5.

We claim:

1. A lightweight, dimensionally stable, non-wood drawing board comprising an inner core of uniform thickness formed of resin-impregnated corrugated paper honeycomb, top and bottom facing sheets laminated to the opposite faces of said inner core and formed of smooth moisture resistant pre-formed sheets of high impact polystyrene and an outer aluminum frame of U-shaped cross section extending completely around said inner core with the spaced legs of said frame extending inwardly toward said inner core and with the bight portion of said frame forming the continuous outermost side edge of the drawing board and with portions only of the top and bottom surfaces of the frame legs adjacent their distal ends being flush and contiguous with the top and bottom surfaces, respectively, of said inner core, the margins of said top and bottom facing sheets overlapping onto said flush top and bottom surface portions, respectively, of said frame legs and being adhered thereto so as to thereby seal said inner core in the envelope formed by said facing sheets and frame, the peripheral edges of said top and bottom facing sheets abutting continuous shoulders formed in the top and bottom surfaces, respectively, of said legs at the junctures of said flush surface portions and the remaining non-flush surface portions.

2. The drawing board of claim 1 wherein said resin-impregnated corrugated paper honeycomb core has (1) from ¼ to ½ inch vertical cells, (2) a vertical thickness of from ½ to ¾ inch, and (3) a phenolic resin content of approximately 10 percent.

* * * * *